Sept. 10, 1963 E. F. MACKS ET AL 3,103,364

PHONOGRAPH TURNTABLE

Filed Sept. 6, 1960 2 Sheets-Sheet 1

INVENTORS
ELMER FRED MACKS
& JOHN A. FUNK for Watts, Edgerton, Pyle & Fisher
by [signature] Attorneys INVENTORS
ELMER FRED MACKS
& JOHN A. FUNK
BY Thomas L. Taylor
for Watts, Edgerton, Pyle & Fisher
Attorneys

United States Patent Office 3,103,364
Patented Sept. 10, 1963

3,103,364

PHONOGRAPH TURNTABLE

Elmer Fred Macks, Vermilion, and John A. Funk, Elyria, Ohio; said Funk assignor to said Macks, doing business as Tribo-netics Laboratories, Vermilion, Ohio Filed Sept. 6, 1960, Ser. No. 54,275
13 Claims. (Cl. 274—39)

Figure 1:
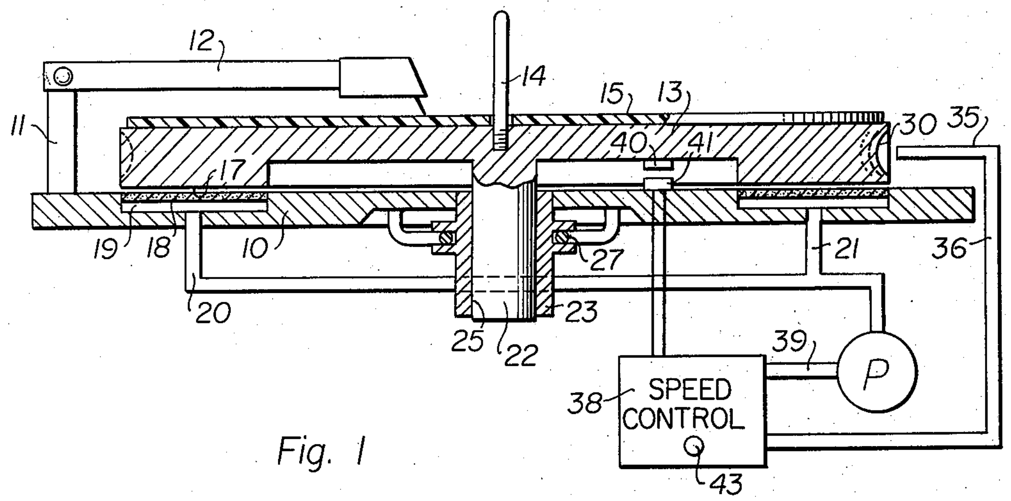

This invention pertains to phonograph and memory-type turntables and more particularly to a turntable support and drive mechanism.

In modern phonographs, and particularly in that class of phonograph known as "stereo" high fidelity or "Hi-Fi," the standards for an acceptable support and drive mechanism are extremely high. These standards dictate very careful control over the noise level emitted by the rotating assembly. Variations in the specified speed of rotation result in distortions in the quality of sound reproduction. Noise in the rotating assembly is often heard, usually in an amplified form, in the sound projected by the phonograph speakers.

Noise in the rotating assembly is usually attributable to the drive motor and to the drive mechanism and bearing assembly on which the turntable rotates. In the case of motor noise it is often caused by either electrical hum or motor bearing rumble. Noise caused by either the motor or the turntable bearings or drive mechanism will increase as the mechanism is used because of wear. Thus, the noise problem is not limited to that which exists at the time of manufacture, because it may be more objectionable after the mechanism has been in use for a period of time.

With the present invention the noise is not only eliminated initially as has been indicated above, it is eliminated permanently because there are no contacting and wearing parts in the rotating assembly.

Wearing parts are eliminated by supporting the turntable on a film of air as it rotates. A simplified, essentially noiseless air turbine is used to cause rotation of the assembly. Since the turntable is supported on air and driven by air, there is no mechanical noise to be picked up by the sound producing system. Finer tone reproduction and amplification is possible.

Prior mechanisms have been driven by electric motors and speed control has presented some problems. As the mechanism ages the motor often tends to slow up. Usually this is attributable to thickening and contamination of oil used to lubricate the motor bearings. Even when oil free or boundary lubrication type bearings are employed, dirt will tend to slow the motor. Further, variations in line voltage and other factors can also affect the speed of operation.

With the present mechanism controlled constant speeds, throughout the life of the mechanism, are obtained. These control speeds are obtained while selectability of speed required for operation with all types of records is provided. A speed sensing and control mechanism is employed to control the speeds. If the speed of the turntable drops below the desired level, the flow of air through the nozzle is increased and vise versa.

Accordingly, one of the principal objects of this invention is to provide a novel and improved phonograph assembly that is more silent than any known presently used system.

A related object of this invention is to provide a turntable that is silent in operation because it is supported on a film of air and rotated by an air turbine.

Another object of this invention is the provision of a novel and improved turntable mechanism made in accordance with the foregoing objects in which a speed responsive means is provided to control the flow of air through the turbine nozzle and therefore the speed of rotation of the turntable.

A further object of this invention is to provide a turntable having a lower annular thrust surface supported on a film of air supplied through foraminous members on a frame such that the turntable is supported on a pneumostatic film of air and the provision of a radial locating means between the frame and the turntable.

A related object of this invention is to provide a radial locating mechanism in the form of a cylindrical spindle depending from the turntable and a co-acting sleeve connected by a yoke means to the frame such that the sleeve is free to align itself with the spindle.

Another object of the invention is to provide a novel and improved thrust mechanism for absorbing transient axial loads through the provision of a trapped pocket of air between a spindle and a housing which pocket resists transient axial loads through either suction or pressure depending upon the direction in which the load is applied.

A further object of the invention is to provide a thrust bearing in the form of two flat discs which discs utilize air under pressure introduced near the axis generate a load carrying film to maintain the two spaced and utilization of the Bernoulli principle to provide suction and inhibit separation of the two.

Figure 2:
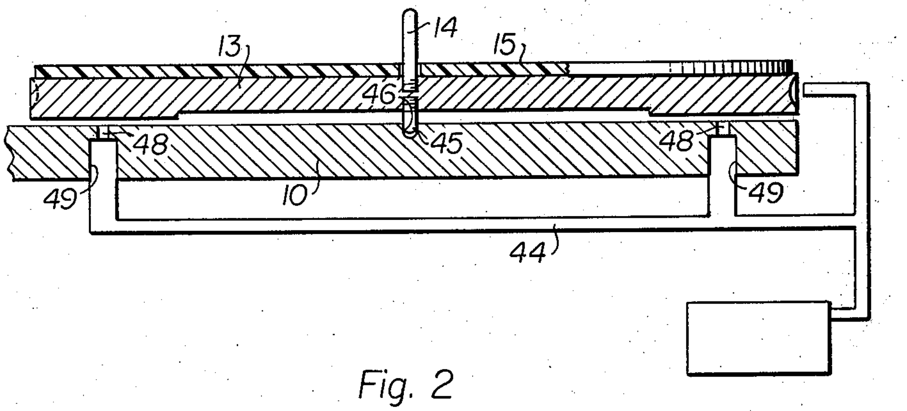
Figure 3:
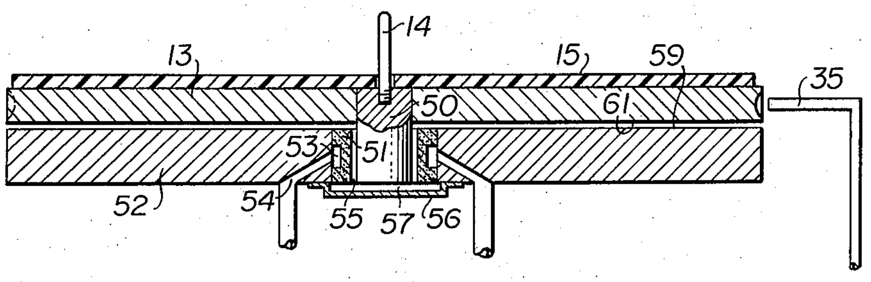
Figure 4:
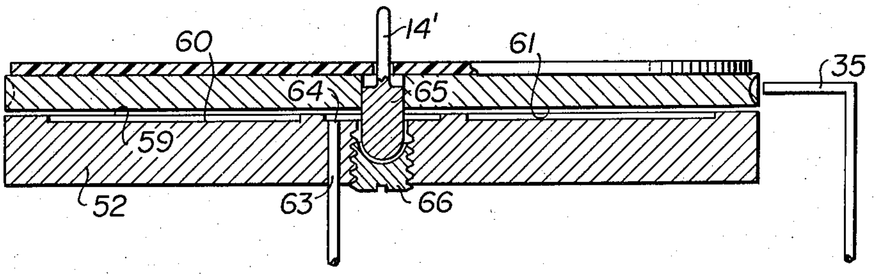

Other objects and a fuller understanding of the invention may be had by referring to the following description and claims, taken in conjunction with the accompanying drawings, in which:

FIGURE 1 is a sectional view of the improved turntable showing one form of thrust and radial bearings and showing a pick-up arm; and, FIGURE 2 through FIGURE 4 are similar views showing other forms of thrust bearings and other forms of radial locating means, and eliminating the pickup for simplicity of illustration.

Referring now to the drawings, a frame is shown generally at 10. The frame includes a pick-up arm support 11. A pick-up arm 12 is pivotally mounted on the support 11 in the usual manner.

A turntable 13 is rotatably suppoorted on the frame in a manner which will subsequently be described in greater detail. An axially disposed centering pin projects upwardly from the turntable to locate one or more records 14 positioned on the turntable 13.

The turntable 13 includes an annular supporting surface 17. The supporting surface 17 is provided on the lower face of the turntable. The surface should be finished to about 16 microinch R.M.S. or smoother and limited in taper to about 0.0003 inch per inch. Greater tolerances can be permitted at the expense of an increased volume of air to support the turntable.

In the embodiment of FIGURE 1, an annular foraminous wall 18 is provided. This wall may, for example, be a sintered bronze member. While the wall 18 is shown as an annulus, it will be recognized from the ensuing discussion that three or more segmental members may replace the annulus and provide support for the supporting surface 17. The pneumostatic support surface is "compensated" to provide inherent leveling and thus permit minimum gas flows and maximum reliability. Gas film compensation may take the form of orifices, or permeable, foraminous or stepped surfaces. For purposes of illustration permeable compensation by means of the foraminous wall 18 is shown in FIGURE 1 and orifice compensation in FIGURE 2.

A very simple and inexpensive support is shown in FIGURE 3. This is a single-face, two-directional thrust bearing for both suction and pressure which will be described below.

The frame 10 has a cavity formed in it to define a chamber 19 between the frame and the wall 18. The chamber may, if segments are substituted for the annulus, be a plurality of chambers, each, of course, adjacent one of the segments. Fluid, preferably air, is supplied to the chamber 19 from a source of fluid under pressure P. In FIGURE 1 a pair of conduits 20, 21 connect the source of pressure P to the chamber 19. It will be recognized that any number of conduits may be provided.

When air under pressure is fed to the chamber 19 it passes through the foraminous wall 18. The wall provides a restriction to this flow of fluid. This restriction to the flow is often referred to as fluid compensation. That is, the flow compensates or adjusts to the load carrying requirements of a generated load carrying film of fluid. This adjustment or compensation is described below.

Since the wall provides a restriction to the flow, a pressure drop will occur which is proportional to the rate of flow. The larger the flow, the greater the pressure drop. When the turntable is positioned on the frame the support surface confronts the wall 18 and inhibits the flow of fluid through the wall. The closer the surface 17 comes to the wall 18, the greater will be the inhibiting effect on the flow. Thus, as the surface 17 comes closer to the wall 18, the rate of flow through the wall will decrease and a load supporting film of fluid will form between the surface 18 and the wall. As the flow through the wall decreases because of closer confrontation of the wall 18 by the surface 17, the pressure drop will decrease. Since the pressure drop decreases the pressure in the film will increase. This action also provides an inherent leveling action if the load is off-center.

In this described manner a film of air is formed between the surface 17 and the wall 18. This film is supplied by air flowing through the wall 18. Air from the film, in turn, escapes radially in both directions from the annular region, or area of confrontation between the wall and the surface.

The film generated in this manner will support the turntable. As more records are dropped on the turntable the load imposed on this film is obviously increased. As the load is increased the turntable will tend to move toward the wall 18 and compress the film. Since, as has been described above, movement of the surface 17 toward the wall 18 results in a decrease in pressure drop through the wall 18, this movement of the surface 17 must also result in an increase in the pressure in the generated film. When the pressure in the film increases, the load carrying capacity of the film of course increases. Through this described effect on the flow of air through the wall and on the pressure of the generated film, an inherently self-balancing mechanism is provided.

In keeping with the concept of a turntable which does not contact the frame, a radial location means in the form of a pneumodynamic bearing is provided in FIGURE 1. A pneumodynamic bearing is one which does not rely on an external supply of air under pressure as compared with a pneumostatic bearing such as the described thrust bearing which does. The pneumodynamic bearing in this instance is provided by a downwardly extending axially disposed spindle 22 and a coacting sleeve 23. The spindle is connected to the turntable 13 while the sleeve 23 is connected to the frame 10. The outer surface of the spindle is cylindrically contoured as is inner surface 25 of the sleeve 23. In a preferred embodiment of the invention, these cylindrical surfaces are at least about 16 microinch R.M.S. in smoothness and have no more taper than 0.0003 inch per inch of length. The diametral clearance will be from 0.0002 to 0.0005 inch per inch of spindle diameter. The out of round should be limited to 0.0001 inch per inch of diameter.

Since the thrust and radial bearings are essentially normal to one another and made to close tolerances, self-alignment is provided by the mechanism shown. The sleeve is carried by a yoke 27. The yoke connection permits the sleeve to move enough relative to the frame to allow the sleeve to align itself with the spindle.

Since it is desirable to provide a turntable which is out of contact with everything other than air and the record, and since the drive mechanism in prior phonographs has often been the source of noise that is amplified by the sound producing system, a novel and simple drive mechanism is provided.

A plurality of turbine blades 30 are formed in the peripheral portion of the turntable 13. These blades must be circumferential in the sense that they form a concentric circle about the axis of the device though they need not be peripheral as shown.

A turbine nozzle 35 is positioned to direct a stream of pressurized air on the blades 30 and cause rotation of the turntable. An air supply conduit connects the nozzle 35 to a speed control mechanism 38. The speed control 38 is, in turn, connected to the source of air under pressure P by a conduit 39. Other drive mechanisms such as a magnetic drive may be substituted, however, the air drive is preferred to maintain a low noise level.

Previously it has been noted that fidelity of sound reproduction depends in part upon proper speed of rotation. To accomplish this speed control a magnet 40 (one or more may be used) is secured to the turntable 13 and rotates with it. A sensing element 41 which is responsive to a magnetic field is mounted on the frame below the circle in which the magnet rotates. The element 41 (or elements) transmits an impulse to the speed control mechanism 38. If the turntable is not rotating at the speed selected by the prior positioning of selector knob 43 (i.e., 16, 33, 45, or 78 r.p.m. with present records) the speed control 38 adjusts the flow of air through the conduit 36 to the nozzle 35.

In FIGURE 2 other radial and axial turntable locating means are shown. For radial location a pivot pin 45 is connected to the turntable 13. The pin 45 coacts with the walls of a bore 46 formed in the frame 10 to limit relative radial movement of the table and the frame. The pivot pin is vertically adjustable if desired to provide for minimum torque or noise.

The thrust bearing fluid compensation of FIGURE 2 is obtained through what is known as orifice compensation. At least three orifices 48 are provided. The orifices are preferably equally spaced circumferentially and radially speaking. The orifices may be, for example, about 0.006 inch in diameter and about 0.010 inch in length. Each orifice 48 is supplied by a larger diameter hole 49. Each hole 49 is in turn connected to a conduit 44 which conducts air from the source P.

In FIGURE 3 the turntable 13 has a smooth, cylindrically contoured depending pin 50 which is centrally disposed. To obtain a radial load carrying bearing, an annular insert 51 is carried by the frame 52. The insert 51 in the disclosed embodiment has a peripherally disposed, annular air distribution groove 53. Air under pressure may be supplied to the groove 53 through one or more supply conduits 54.

The annular insert 51 is, in the disclosed embodiment, a foraminous member which permits the air under pressure to pass from the distribution groove 53 to a region 55 between the pin 50 and the insert 51. A sealing end cap 56 is secured to the base 52 to define a trapped pocket of air in the space 57 between the cap 56 and the end of the pin 50. Air escapes radially outwardly from the region 55 through the space between the table 13 and the base 52.

In the disclosed arrangement, an annular thrust surface 59 is provided in the base adjacent the peripheral limits of the table 13. A plurality of circumferentially spaced recesses 60 may be provided, if desired, in the surface 59 (FIGURE 4), or the annular surface 59 may, as is shown in FIGURE 3, may be smooth and flat from its periphery inwardly to the insert 51.

With the construction of FIGURE 3, a very simple and inexpensive thrust arrangement is provided which simply utilizes the air leaking from the radial bearing to support the table. Additionally, the pocket at 57 provides a two-way thrust bearing for transient loads. Trapped air under pressure in the pocket 57 assists in supporting the table. Any transient, axial loads imposed on the table and tending to separate the table from the base, such as if the mechanism is inverted temporarily, will be resisted by a suction action obtained in the space 57. Thus, a very simple and inexpensive two-way thrust arrangement is obtained.

FIGURE 4 includes the arrangement mentioned above where depressions 60 in surface 59 on the base 52 are provided. The table 13 has a co-acting surface 61. Supporting air is introduced through a passage 63 and distributed circumferentially by an annular recess 64 formed at the inner limit of the surface 59.

In the mechanisms of both FIGURES 3 and 4, a unique two-way thrust bearing is provided. Air supplied near the axis of the surfaces 59, 61 provides a supporting film as described above. Because of the Bernoulli principle, suction will pull the table and base together. The weight of the table and supported records will maintain the two sufficiently close together for this principle to operate when rotation is about a vertical axis. If rotation is about a horizontal axis, a stop should be provided to keep the table and base sufficiently close so that the created suction can pull the two together.

The record locating pin 14' has an enlarged lower portion 65 which is in press-fit engagement with the table 13 to provide radial location. An adjustable plug 66 is threaded into the base below the portion 65. The plug may be adjusted so that it provides a pivot overload arrangement to protect the thrust bearing surfaces 59, 61 while at the same time being positioned so that it is normally out of contact with the portion 65 when the device is elevated on a film of air and in use.

While the preceding disclosure has been limited to static thrust bearings, it should be noted that under proper conditions a dynamic thrust bearing may well suffice. As an example, a record player designed to take only one record at a time obviously does not impose the load carrying requirements on the bearing that an automatic record changer imposes. Under such circumstances a thrust bearing such as one of those disclosed in U.S. patent application, Serial No. 594,026, filed on June 26, 1956 for Fluid Dynamic Bearing and Method of Making Same, now United States Letters Patent No. 2,996,340, issued August 15, 1961, may well suffice.

While the invention has been described with detail it is believed that it essentially comprises a turntable carried on a thrust bearing of a fluid type, radial locating means, and means to cause rotation of the turntable relative to a frame.

Although the invention has been described in its preferred form with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. In a phonograph record playing mechanism the combination of, a support member carried by a frame and including a fluid thrust bearing, a phonograph turntable supported on the bearing, a fluid radial bearing interposed between the turntable and the support member to limit relative radial movement, said turntable including a plurality of circumferentially disposed turbine blades, a turbine nozzle mounted on the frame and positioned to emit a stream of turntable rotating air on the blades, and supply means connected to the nozzle to supply a quantity of air under pressure to the nozzle and to said fluid thrust bearing.

2. In a phonograph record playing mechanism the combination of, a support member carried by a frame and including a fluid thrust bearing, a phonograph turntable supported on the bearing, means interposed between the turntable and the support member to limit relative radial movement, said turntable including a plurality of circumferentially disposed turbine blades, a turbine nozzle mounted on the frame and positioned to emit a stream of turntable rotating air on the blades, supply means connected to the nozzle to supply a quantity of air under pressure to the nozzle, and sensing means operably connected to the turntable to sense the speed of rotation and connected to the supply means to control the flow of air supplied to the nozzle and thereby control the turntable speed of rotation.

3. The device of claim 2 wherein the sensing means includes means to preselect the controlled speed of turntable rotation.

4. In a phonograph having a frame with a pickup arm, a turntable mounted on the frame for rotation relative to the frame and the pickup, and means interposed between the turntable and the frame to cause the table to rotate relative to the frame, the combination of, coacting means on the frame and the turntable for generating a supporting film of air therebetween, at least three regions locating an annulus, a radial locating spindle depending from the turntable on the axis thereof and having a smooth external surface the peripheral extremities of which locate a cylinder, a tubular sleeve having a smooth internal surface contoured to coact with the spindle surface and generate a radial load carrying film of air therebetween, and means connecting the sleeve to the frame.

5. The device of claim 4 wherein the means connecting the sleeve to the frame comprises a yoke.

6. The device of claim 4 wherein said surfaces are each cylindrical.

7. The device of claim 4 wherein the coacting means comprises a pneumostatic thrust bearing.

8. In a sound producing mechanism having a table rotatably mounted on a base, means interposed between the table and the base to cause relative rotation and a load carrying gas bearing surface interposed between the table and the base, the combination of, portions on the turntable and on the base defining a pocket in which gas may be trapped, said pocket communicating with the ambient atmosphere through the bearing surface, and means for supplying gas to fill said pocket.

9. A phonograph player comprising a frame having a turntable-confronting surface, said frame including a plurality of restricting orifices opening on said turntable-confronting surface, a turntable having an annular supporting surface disposed adjacent said turntable-confronting surface, said turntable including a plurality of circumferentially disposed turbine blades, a spindle centrally connected to said turntable, a sleeve connected to said frame for receiving said spindle, said sleeve and said spindle including means for forming a radial load-carrying fluid film therebetween, a turbine nozzle mounted on said frame and positioned to emit a stream of fluid on said blades, fluid supply means connected to said nozzle and to said orifices for rotating said turntable and for producing a pressurized, load-carrying film between said annular supporting surface and said turntable-confronting surface, and speed control means operatively connected to said fluid supply means for adjusting the flow of fluid to said nozzle, said speed control means including a sensing element connected to said frame and a cooperating actuating element connected to said turntable.

10. A phonograph player as claimed in claim 9 wherein said means for producing a radial load-carrying film between said spindle and said sleeve comprises a pneumodynamic radial thrust bearing.

11. A phonograph player as claimed in claim 9 wherein said means for producing a radial load-carrying fluid film between said spindle and said sleeve comprises a pneumostatic radial thrust bearing and means connecting said pneumostatic thrust bearing to said fluid supply means.

12. A phonograph player as claimed in claim 9 wherein said orifices in said turntable-confronting surface are formed by said pneumostatic radial thrust bearing.

13. The device of claim 4 in which means are provided for moving the sleeve relative to said spindle.

References Cited in the file of this patent

UNITED STATES PATENTS

| | | |
|---|---|---|
| 2,602,632 | Serduke | July 8, 1952 |
| 2,683,636 | Wilcox | July 13, 1954 |
| 2,885,915 | Schurger | May 12, 1959 |
| 2,950,353 | Fomenko | Aug. 23, 1960 |

FOREIGN PATENTS

| | | |
|---|---|---|
| 799,794 | Great Britain | Aug. 13, 1958 |